A. W. FERNANS.
TRAFFIC SIGNAL FOR AUTOMOBILES.
APPLICATION FILED DEC. 27, 1919.

1,338,430.

Patented Apr. 27, 1920.
3 SHEETS—SHEET 1.

Inventor
A.W. Fernans,
By Watson E. Coleman,
Attorney

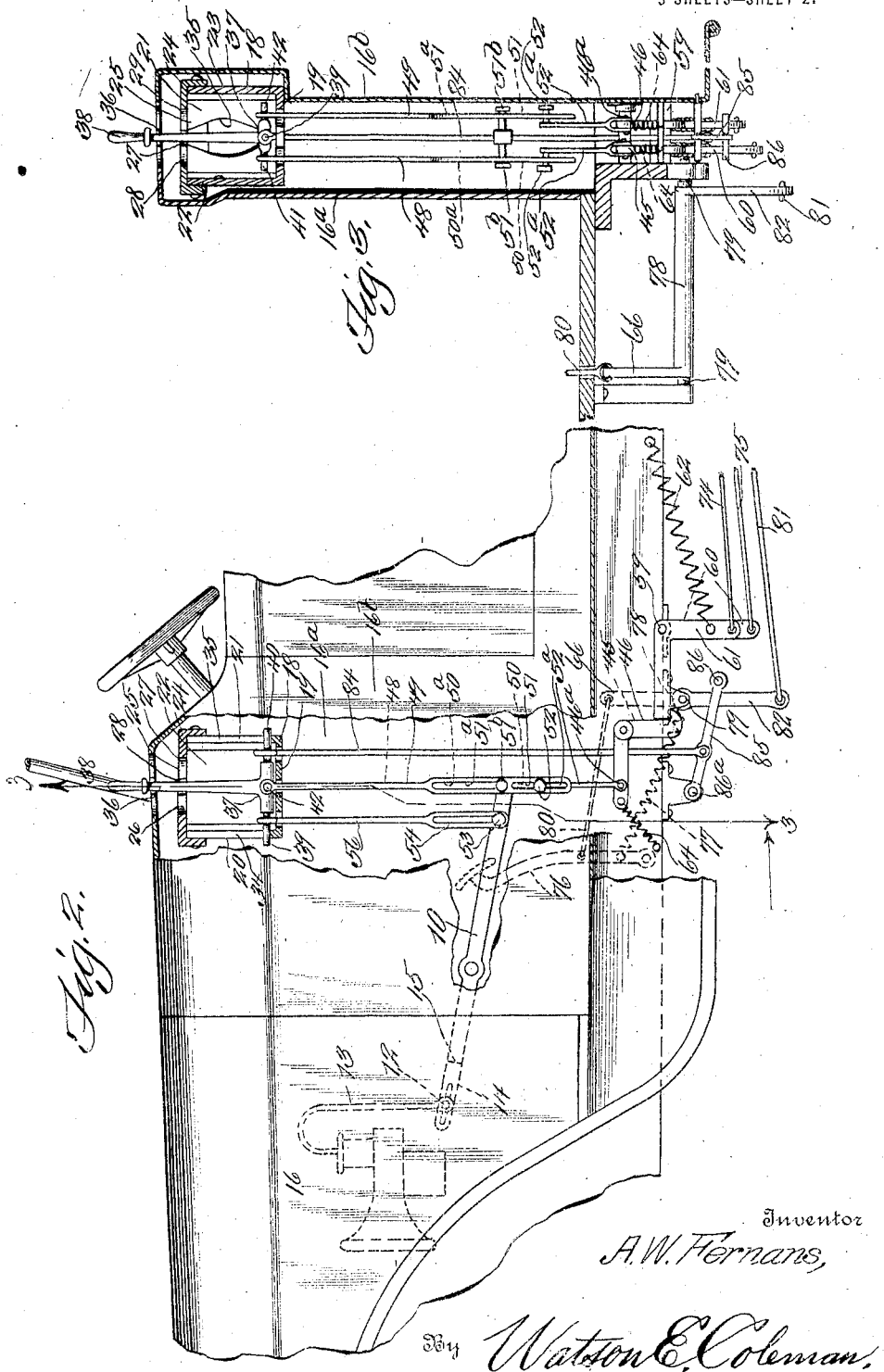

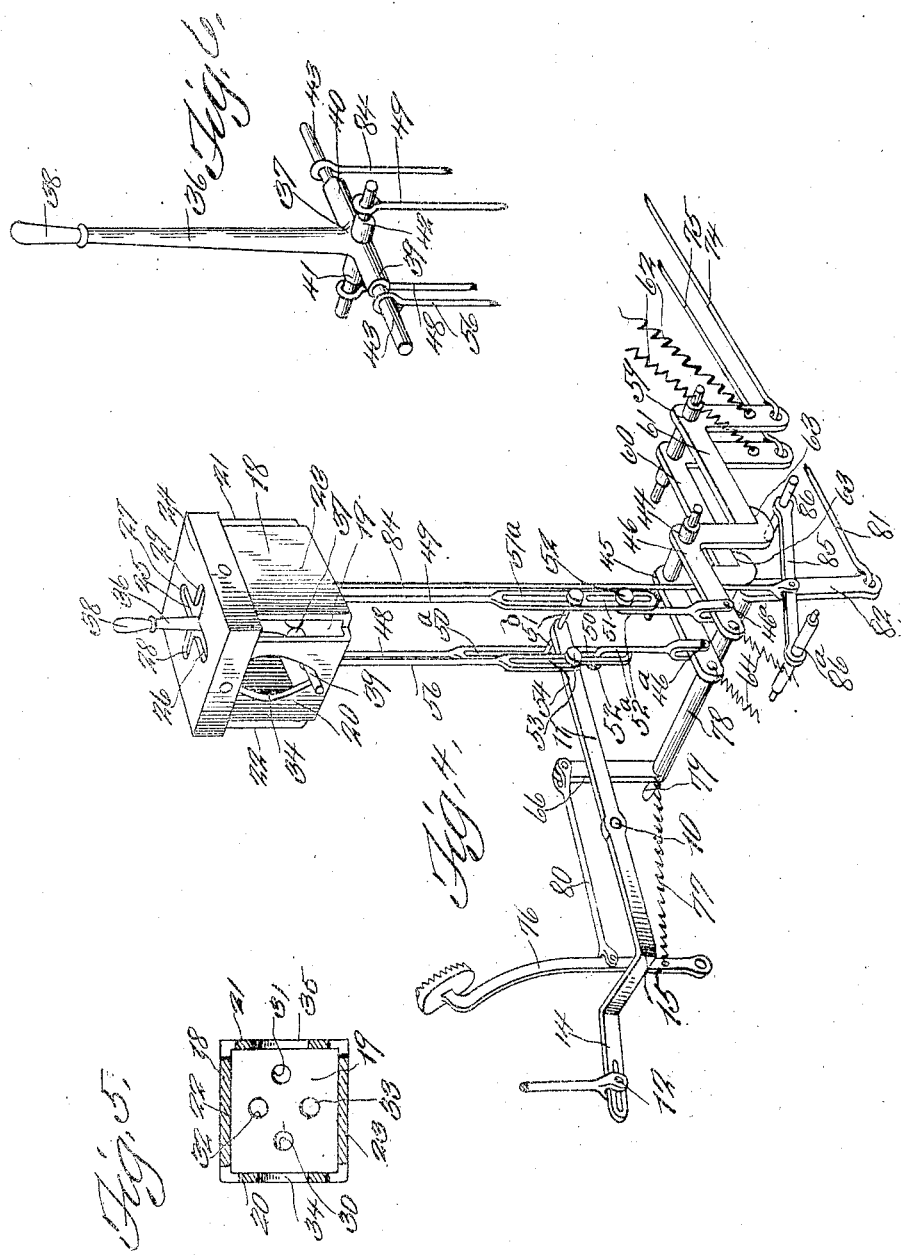

UNITED STATES PATENT OFFICE.

ANTHONY W. FERNANS, OF PAWTUCKET, RHODE ISLAND.

TRAFFIC-SIGNAL FOR AUTOMOBILES.

1,338,430. Specification of Letters Patent. Patented Apr. 27, 1920.

Application filed December 27, 1919. Serial No. 347,742.

*To all whom it may concern:*

Be it known that I, ANTHONY W. FERNANS, a citizen of the United States, residing at Pawtucket, in the county of Providence and State of Rhode Island, have invented certain new and useful Improvements in Traffic-Signals for Automobiles, of which the following is a specification, reference being had to the accompanying drawings.

This invention relates to the art of traffic signals and particularly to the type especially adapted for use in connection with automobiles, and one of the objects of the invention is to provide a signal to indicate to an operator of an automobile at the rear whether the chauffeur of the automobile in front intends to turn either to the right or to the left, or to display a red signal to indicate the intention of stopping or to indicate the intention to go forward.

Another object of the invention is to provide a mechanism for operating the traffic signals, and means connecting said mechanism and the horn for operating the same, so that pedestrians may be notified which direction the automobile will take.

A further object of the invention is to provide a signaling horn having connections with the operating mechanism for the signals at the rear so that the horn may be sounded or operated before turning to the right or to the left, or before signaling danger, which is at the time of applying the brakes, or before starting forward, it being obvious to the chauffeur of the automobile at the rear that when the signals of the automobile in front are returned to their initial positions, it is the intention of the chauffeur of the forward automobile to proceed forward.

While the design and construction at present illustrated and set forth are deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Fig. 3 is a sectional view on line 3—3 of Fig. 2.

Figure 1:
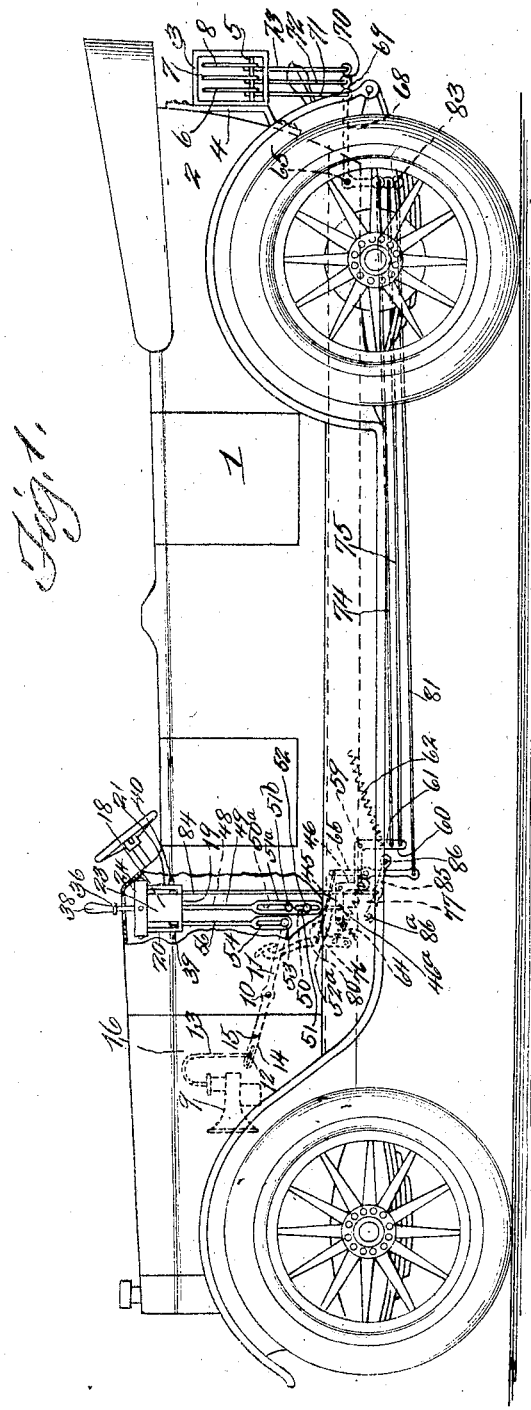
Figure 1 is a view in side elevation of a conventional form of automobile, showing the improved signal mechanism as applied thereto showing certain of the parts in dotted lines and other parts in elevation.
Figure 2:
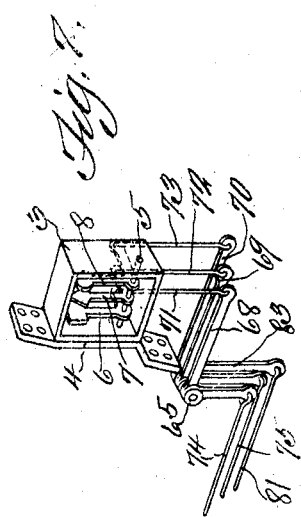
Fig. 2 is a view disclosing fragmentary parts of the frame and body of the automobile, for instance sufficient to illustrate the diagrammatic supports for various parts of the signal mechanism.

Fig. 4 is an enlarged detail perspective view of the housing or boxing 18 showing the operating lever 36, and its connections to be connected to the various signal members, also showing the foot operated lever 76.

Fig. 5 is a transverse sectional view through the housing 18.

Fig. 6 is an enlarged detail perspective view of the operating lever 36 and its connecting rods.

Fig. 7 is an enlarged detail perspective view of the housing 3 and the various signal blades 6, 7 and 8 and showing their connections.

Referring more especially to the drawings, 1 designates a conventional form of automobile to the rear of the body 2 of which a housing 3 is supported by means of the bracket 4. This housing is preferably constructed as that shown, though not necessarily, and pivotally mounted in the housing on the pin 5 is a plurality of direction indicators 6, 7 and 8. The direction indicators 6 and 7 are colored blue and white respectively, indicating right and left, the former having a rectangular end portion, and the latter an arrow shaped end head portion. The indicator 8 is colored red and has a head portion preferably circular in form, though not necessarily. This indicator, when displayed, discloses danger, in other words, that it is the intention of the chauffeur of the automobile to apply the brakes. In fact the display of the red indicator discloses the fact that the brakes have been applied.

Any suitable signaling horn 9 either electrically or mechanically operated, preferably mechanically operated, though not necessarily, is carried by the automobile for instance under the hood. This horn is operated when either one of the right and left indicators is displayed, and may be operated manually without manipulating either one of the direction indicators, but at the time of applying the brakes, at which time the red or danger signal is displayed. However, it is not necessary to operate the horn at this time, but if it is desired by the chauffeur to do so, it can be accomplished without operating the indicators.

Pivotally mounted on the frame of the automobile as at 10 is a lever 11, one end of which has a slot and pin connection 12 with a rod or member 13, which is connected to and operates the horn in any suitable manner (not shown), that is to say when the lever 11 is oscillated. This lever 11 is located under the casing of the body of the automobile, and under the hood 16.

Mounted in any suitable manner between the inner and outer walls of the side adjacent the upper edge thereof of the body of the automobile is a boxing or housing 18. It is possible that the space between the inner and outer walls of the side of an automobile is not wide enough to receive a housing, of sufficient size to carry the operating lever 36 and its connections with the signal members, bearing in mind that it may be desired to apply the signal apparatus to an automobile now in use. In this case, the housing may be attached to the exterior of one side, though not necessarily, near the upper edge of the side, and it may be attached to the inner face of one side of the body of an automobile. If the housing be attached to the exterior of the body of an automobile, then the operative connections between the operating lever 36 and the levers 45 and 46 may remain exposed, though not necessarily, for it is obvious that a housing can be constructed over the operative connections, and to the exterior face of the side of the automobile body. If the housing should be attached to the interior face of the side of the body, the operative connections between the lever 36 and the bell crank levers 45 and 46 may remain exposed. However, in this instance, a casing may be placed over the operative connections for housing the same. Preferably the housing 18 is designed to be placed between the inner and outer walls of the side of the body, as previously stated when manufacturing the automobile body. However, when placing the housing in this position, it is necessary to bulge either the inner wall or the outer wall at the point where the housing is to be placed so as to make sufficient room to receive the housing. In the present instance, the outer wall of the side of the automobile body is bulged outwardly, so as to make room for the housing 18, and it is to be understood that the applicant is not to be confined to the bulging of the outer wall, or he may show this construction. The inner and outer walls of the side of the body are designated by the reference characters 16$^a$ and 16$^b$. The body of the housing or boxing is constructed from a single piece of sheet metal bent to provide a bottom 19 and forward, rear and side walls 20, 21, 22 and 23. A flanged cover 24 is fitted over the housing or boxing to hold the forward, rear and side walls in position. The cover 24 is provided with an opening 25, which includes forward and rear extension slots 26 and 27 and the lateral extension slots 28 and 29. The bottom of the housing or boxing is provided with a plurality of circular openings 30, 31, 32 and 33. These openings 30 to 33 inclusive are positioned to axially aline with the ends of the extension slots 26—29 inclusive. The forward and rear walls of the housing or boxing are provided with elongated elliptical slots 34 and 35.

An operating lever 36 is mounted in the housing or boxing and it comprises a base portion or plate 37 and the handle 38. The base portion or plate 37 comprises forward, rear and side arms 39, 40, 41 and 42. The forward and rear arms 39 and 40 have trunnions 43, which engage the lower ends of the slots 34 and 35 of the forward and rear walls of the boxing or housing 18. By mounting the operating lever in the housing in this manner, it is capable of being rocked either forward, rearwardly or laterally in either direction, for the reason that the handle 38 can move into either one of the extension slots 26, 27, 28 and 29. The slots 34 and 35 are made elliptical so as to permit play of the pintles or trunnions 43, when the operating lever is moved laterally in either direction.

As a rule there is sufficient space between the side rails and the chassis of an automobile and the sheet metal side of the body to house an operating mechanism for the direction indicators. Therefore, preferably pivoted to the outside face of the left hand rail or side of the chassis as at 44, is a pair of bell crank levers 45 and 46. Pivotally connected to the arms 41 and 42 are rods 48 and 49, the lower extremities of which terminate in loops 50 and 51, which have sliding connections with the pins 52 respectively carried by the links 52$^a$, which are connected to the bell crank levers 45 and 46 as at 46$^a$. The lever 11 at its rear end is provided with a transverse pin 53, which engages the elongated loop 54, particularly at its lower end. When the operating lever is moved rearwardly or laterally in either direction, the lever 11 will be oscillated which in turn will operate the signaling horn. A rod 56 is pivotally connected to the arm 39 and has its lower end formed into said elongated loop 54, so that when the operating lever 36 is tilted to the rear, the lever 11 will be oscillated. Also pivoted to the outer face of the left hand side rail of the chassis as at 59 is a pair of bell crank levers 60 and 61, which are under tension of the springs 62, so as to hold certain of their arms in engagement with the notches 63 of the depending arms of the bell crank levers 45 and 46, thereby holding the bell crank levers 45 and 46 set. Springs 64 connect to the bell crank levers 45 and 46 and in turn to a pin of the side of the chassis so as to hold the notched ends of the bell crank levers 45 and 46 in engagement with the bell crank levers 60 and 61.

Pivoted at 65 is a plurality of levers 68, 69 and 70, certain arms of which are connected by the links 71, 72 and 73 to the direction and danger indicators 6, 7 and 8. The links 74 and 75 are connected pivotally to certain other arms of the levers 68 and 69, and these links or rods 74 and 75 are in turn pivotally connected to the levers 60 and 61. A conventional form of brake lever 76 is pivotally mounted on the frame of the automobile and is under tension of the spring 77, so as to hold it in initial position. An oscillatory lever 78 is pivotally mounted at 79 on the frame of the automobile and its upper arm 66 has a rod connection 80 with the foot brake lever 76. A link or rod 81 is pivotally connected to the lower arm 72 which is mounted pivotally and axially with the pivot rod 79 of the lever 78. In other words, the arms 66 and 72 are offset from each other, so that the lever 78 may be connected to the conventional form of foot brake lever, which is located near the center of the body of the car. The arm 72 is arranged toward the left hand end of the rod 79 so that the link or rod 81 can be connected to the arm 83 of the lever 70. It will be noted that when the foot brake lever 76 is applied, the lever 78 will be oscillated, which in turn will oscillate the bell crank lever 70, which will actuate to display the danger signal or indicator, and at the same time with the display of this indicator, the usual brake mechanism of the automobile will be applied.

A rod 84 is pivotally connected to the arm 40 of the base of the operating lever 36 and this rod 84 is in turn pivotally connected at its lower end to the lever 85. One end of the lever 85 is provided with a transversely extending pin 86, the lateral ends of which support the bell crank levers 60 and 61, that is when they are released from engagement with the notches of the levers 45 and 46. It will be noted that the lever 86 is so pivotally mounted as at 86ª that when the operating lever 36 is oscillated forwardly, a pulling action will be imparted to the rod 84 which will cause the lever 85 to move pivotally upwardly, causing the lateral ends of the pins 86 to reset the bell crank levers 60 and 61 to their initial positions in engagement with the notches of the bell crank levers 45 and 46.

When the operating lever 36 is moved to the right, the base of the operating lever will rock in the boxing or housing upon its trunnions 43. When the base of said lever is to be operated, a pulling action is imparted to the rod 49 so that the lower end of the loop 51 will pull against the pin 52, oscillating the bell crank lever 46 disengaging its notch from contact with the lever 61. Through the action of one of the springs 62, the bell crank lever 61 will be oscillated rearwardly causing a pushing action to be imparted to the rod 74 so oscillating the lever 68 as to cause it to actuate the blue indicator so as to cause it to project from the housing, thereby displaying its color, indicating that the chauffeur of the automobile intends to turn to the right. In other words, when the blue arrow is displayed it points to the right and indicates to the chauffeur behind that the chauffeur in front intends to turn to the right.

When the operating lever 37 is moved to the left, a pulling action is imparted upon the rod 48 which will cause an oscillatory movement of the bell crank lever 45 disengaging its notch from contact with the lever 60. The spring connected to the lever 60 will move the lever rearwardly imparting a pushing action upon the rod 75 so oscillating the lever 69 as to cause the direction indicator colored white to be displayed, indicating that the chauffeur of the automobile intends to turn to the left. When the chauffeur intends to turn to the right, the operating lever is moved or oscillated to the right, causing the direction indicator colored blue to be displayed indicating that the chauffeur intends to turn to the right. The chauffeur will always push the controlling lever toward the direction to be taken, the white arrow indicating the left and the blue arrow or square indicating the right.

When either one of the direction indicators has been displayed and it is desired to restore the operating parts thereof to their initial positions, the operating lever 36 may be oscillated forwardly causing the rod 84 to actuate the lever 85 so as to restore one of the arms of either of the bell crank levers 60 and 61 in engagement with its respective notch 63 of one of the bell crank levers 45 and 46. While it is true that both right and left indicators are not operated at the same time, nevertheless it is possible that the wrong indicator may be operated accidentally. In such an instance, it is possible for the chauffeur, before restoring the indicator which has been operated by mistake, may operate the indicator to show the proper direction the chauffeur intends to take, therefore in such an instance both indicators will have become operated, and when it is desired to restore both indicators, the operating lever 36 may be moved or oscillated forwardly which will manipulate the lever 75, and cause the restoration of both indicators, after which the indicator for disclosing the proper direction may be actuated.

The rods 48 and 49 above the elongated loops 50 and 51 are provided with additional loops 50ª and 51ª, the lower crotches of which are engaged by the lateral lugs 51ᵇ of the lever 11. It will be noted that the lateral lugs 51ᵇ extend axially from opposite sides of the lever 11 near one end, while the lateral pins 52 of the links 52ª extend laterally and are disposed substantially midway the loops 50 and 51, so as to permit the horn to be sounded before the indicators are released. When the controlling lever 36 is moved toward the left, a pulling action is imparted upon the rod 48, which pulls upon one of the lugs 51ᵇ, thereby pulling upon one of the links 52ª so as to tilt the lever 45. The movement of the rod 48 causes a tilting movement of the lever 11, and allows the controlling lever 36 the benefit of a full sweep. The pin 53 of the lever 11 will slide upwardly partially in the loop 54 of the rod 56. When the operating lever 36 is manipulated to attain this result, the bottom of the loop 50 does not engage the lateral pin 52 of the link (which is connected to the bell crank lever 45) until the rod 48 is nearly at the limit of its upward movement as it is only necessary to tilt the bell crank lever 45 sufficient to disengage one of its arms from the bell crank lever 60. The same operations of corresponding parts, namely those connected to the rod 49 will be performed, when the operating lever 36 is moved to the left. By moving the operating lever 36 rearwardly, the horn lever 11 is oscillated in which case a pulling action is imparted on the lateral pin 53, as the pin engages the bottom of the loop 54, thereby causing the lever 11 to operate the horn.

When it is desired to operate the horn, the operating lever 36 may be oscillated rearwardly, and through the medium of the rod 56 which is connected to the lever 11, the link or rod 13 may be actuated to operate the horn, without operating either one of the direction indicators.

It is to be understood that when the direction indicators are restored to their initial positions, it indicates to the chauffeur of an automobile at the rear, that the chauffeur of the automobile in front intends to proceed forwardly. In other words, the act of restoring either one of the direction indicators, is designed to be taken as a signal that it is the chauffeur's intention to proceed forwardly. When the direction indicators are restored to their initial position at the time the automobile is to proceed forwardly, the horn is actuated simultaneously therewith thereby signaling to the pedestrians that the automobile is ready to proceed forward.

The bell crank levers 45 and 46, when either one or both have been actuated, are supported upon a pin 86.

When the chauffeur has displayed either one of the direction indicators, thereby indicating that it is the intention to turn the automobile to the left or to the right, it is the aim to stop the automobile before turning to the right or to the left, to avoid an accident, and the chauffeur applies the foot brake, the red indicator is automatically displayed indicating danger. This signal is at the rear of the two direction indicators and is the only one seen when displayed, regardless of either one of the direction indicators displayed as it covers the direction indicators.

At night an oil or an electric lamp may be used to throw the rays on either one of the indicators or upon the danger indicator. This lamp may be mounted above the mud guard so that the rays may strike directly on the signals.

The invention having been set forth, what is claimed as new and useful is:—

1. In a traffic signal as set forth, the combination with right and left direction indicators, of a signaling horn including an operating lever therefor, a mechanism operatively connected to the right and left direction indicators, and means connected to parts of said mechanism and to said operating lever of the horn, whereby the horn may be sounded before the display of either one of the indicators.

2. In a traffic signal as set forth, the combination with right and left direction indicators, of a signaling horn including an operating lever therefor, a mechanism operatively connected to the right and left direction indicators, means connected to parts of said mechanism and to said operating lever of the horn, whereby the horn may be sounded before the display of either one of the indicators, and means actuated by the last mentioned means for restoring certain of the parts of said mechanism to their initial positions, thereby restoring the direction indicator to its normal position.

3. In a traffic signal, the combination with right and left direction indicators mounted at the rear of the automobile, of a spring tensioned mechanism operatively connected to the direction indicators respectively, said spring tensioned mechanism including bell crank levers adapted to be actuated to display one or both of the signals, and an oscillatory lever provided with depending rods having loose loop connections with said bell crank levers, so that when the oscillating lever is moved, either one of the bell crank levers may be allowed to oscillate slightly to release said mechanism, allowing the signal to be displayed.

4. In a traffic signal, the combination with right and left direction indicators mounted at the rear of the automobile, of a spring tensioned mechanism operatively connected to the direction indicators respectively, said spring tensioned mechanism including bell crank levers adapted to be actuated to permit one of the signals to be displayed, and an oscillatory lever provided with depending rods having loose loop connections with said bell crank levers, so that when the oscillating lever is moved, either one of the bell crank levers may be allowed to oscillate slightly to release said mechanism, allowing the signal to be displayed, a horn including an actuating member therefor and means connected to said actuating member and in turn having loose connections with said rods, whereby when the oscillating lever is moved in either direction laterally, the horn actuating member will oscillate and sound the horn before the direction indicator is displayed.

5. In a traffic signal, the combination with right and left direction indicators mounted at the rear of the automobile, of a spring tensioned mechanism operatively connected to the direction indicators respectively, said spring tensioned mechanism including bell crank levers adapted to be actuated to permit one of the signals to be displayed, and an oscillatory lever provided with depending rods having loose loop connections with said bell crank levers, so that when the oscillating lever is moved, either one of the bell crank levers may be allowed to oscillate slightly to release said mechanism, allowing the signal to be displayed, a horn including an actuating member therefor and means connected to said actuating member and in turn having loose connections with said rods, whereby when the oscillating lever is moved in either direction laterally, the horn actuating member will oscillate and sound the horn before the direction indicator is displayed, means connecting the oscillating lever and the means connected to the horn operating member, whereby when the oscillating lever is tilted rearwardly the horn may be operated without actuating the direction indicators.

6. In a traffic signal, the combination with right and left direction indicators carried by the rear end of the automobile, spring tensioned bell crank levers operatively connected to said right and left indicators, a second pair of bell crank levers coöperatively connecting with the first bell crank levers to hold them set against the action of the spring tensioned means to hold the direction indicators in their initial position, an oscillating lever provided with depending rods having loose loop and pin connections with the second pair of bell crank levers, whereby as the oscillating lever is moved to the right or to the left, one of the second bell crank levers may be oscillated to release its respective spring tensioned bell crank lever, allowing the proper indicator to be displayed, a pivoted lever on the frame of the automobile and having its lower end provided with a lateral pin, the opposite ends of which being adapted to be engaged by and support the first bell crank levers to limit them in their movement, and a connection between said oscillating lever and the pivoted lever for restoring the first bell crank levers, when the oscillating lever is tilted forwardly.

7. In a traffic signal, the combination with right and left direction indicators carried by the rear end of the automobile, spring tensioned bell crank levers operatively connected to said right and left indicators, a second pair of bell crank levers coöperatively connecting with the first bell crank levers to hold them set against the action of the spring tensioned means to hold the direction indicators in their initial position, an oscillating lever provided with depending rods having loose loop and pin connections with the second pair of bell crank levers, whereby as the oscillating lever is moved to the right or to the left, one of the second bell crank levers may be oscillated to release its respective spring tensioned bell crank lever, allowing the proper indicator to be displayed, a lever pivoted on the frame of the automobile and having its lower end provided with a lateral pin, the opposite ends of which being adapted to be engaged by and support the first bell crank levers to limit them in their movement, and a connection between said oscillating lever and the pivoted lever for restoring the first bell crank levers, when the oscillating lever is tilted forwardly, a horn having an actuating member therefor, and means connecting said actuating member of the horn and the depending rod connections of the oscillating lever, whereby when either one of the direction indicators is oscillated, or when the indicator is restored to initial position, the horn may be previously sounded.

8. In a traffic signal as set forth, the combination with right and left direction indicators, of an audible signal including operating lever therefor, an operating mechanism connecting the right and left indicators and the audible signal, a single operating element, and means connecting said element to the lever and to a certain plurality of parts of said mechanism, whereby said lever may be operated and certain parts of the mechanism actuated to display the indicators a substantial time subsequently to the sounding of the audible signal.

9. In a traffic signal as set forth, the combination with right and left direction indicators, of an audible signal including operating lever therefor, an operating mechanism connecting the right and left indicators and the audible signal, a single operating element, and means connecting said element to the lever and to a certain plurality of parts of said mechanism, whereby said lever may be operated and certain parts of the mechanism actuated to display the indicators a substantial time subsequently to the sounding of the audible signal, and means connecting the single element and certain other of said parts of said mechanism to actuate said parts to restore them to initial position and the indicators to their normal positions.

10. In a traffic signal as set forth, the combination with right and left direction indicators, of a mechanism operatively connected to the indicators respectively, said mechanism having spring tensioned elements, means for holding said elements set, and a single device connected to and operating said holding means to release either one of the spring tensioned elements to permit it to display its indicator.

11. In a traffic signal as set forth, the combination with right and left direction indicators, of a mechanism operatively connected to the indicators respectively, said mechanism having spring tensioned elements, means for holding said elements set, and a single device connected to and operating said holding means to release either one of the spring tensioned elements to permit it to display its indicator, and means operated by said single device to restore either one or both of said holding means to their initial positions and return the indicators to their normal positions.

12. In a traffic signal, the combination with right and left direction indicators, of tensioned members connected to said indicators, holding elements for said members, and a single device for actuating either one of the elements to release its respective tensioned member, whereby the signal may be displayed.

13. In a traffic signal, the combination with right and left direction indicators, of tensioned members connected to said indicators, holding elements for said members, and a single device for actuating either one of the elements to release its respective tensioned member, whereby the signal may be displayed, and means actuated by said device for returning either one or both of the members in engagement with their holding elements.

14. In a traffic signal, the combination with a right and left direction indicator, of tensioned members connected to said indicators, holding elements for said members, and a single device for actuating either one of the elements to release its respective tensioned member, whereby the signal may be displayed, and means actuated by said device for returning either one or both of the members in engagement with their holding elements, an audible signal, an operating lever therefor, and means connected to said lever and operated by the single device to sound the audible signal prior to the actuation of either of the holding elements.

In testimony whereof I hereunto affix my signature.

ANTHONY W. FERNANS.